Jan. 6, 1931. A. E. RASMUSSEN 1,787,492
PIPE JOINTER
Filed July 3, 1928
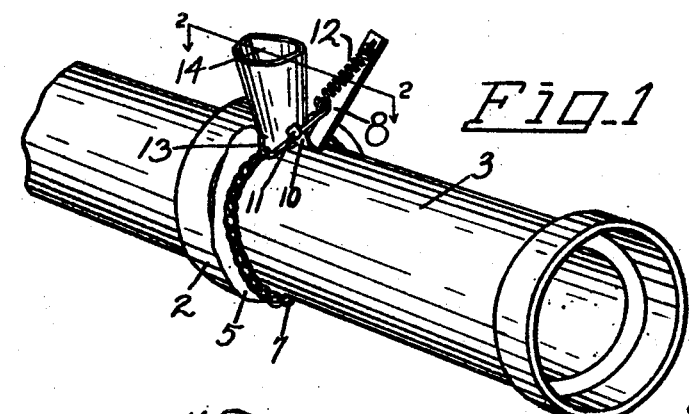
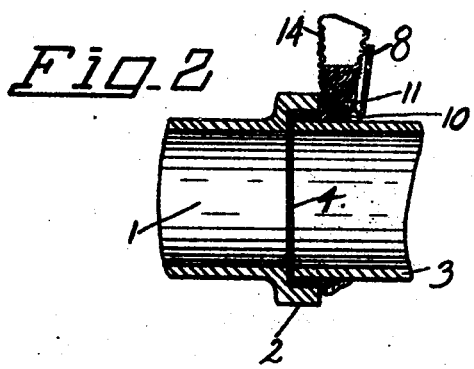
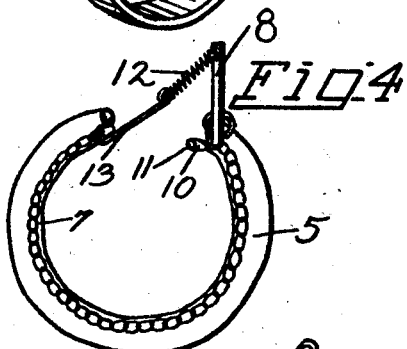
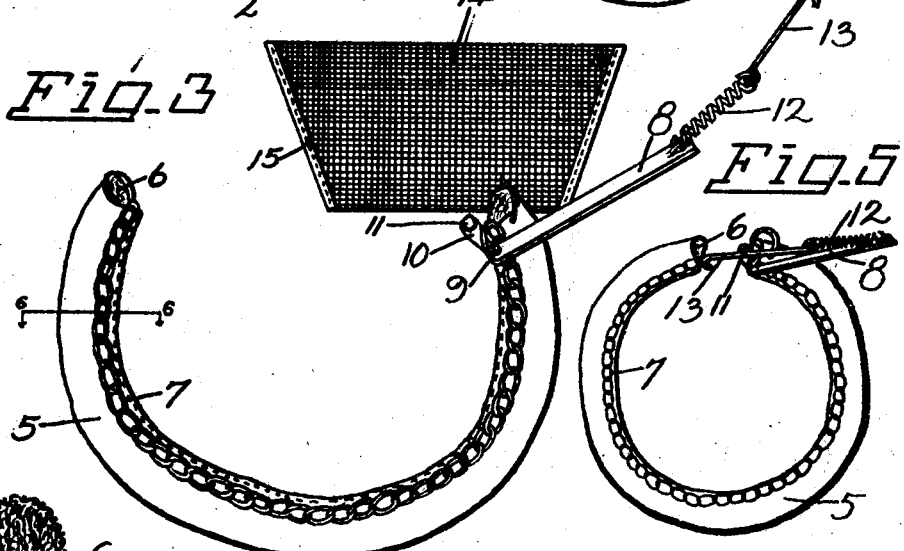
Albert E. Rasmussen   Inventor
By  *Herbert E. Smith*
Attorney Patented Jan. 6, 1931

1,787,492

UNITED STATES PATENT OFFICE

ALBERT E. RASMUSSEN, OF YAKIMA, WASHINGTON, ASSIGNOR OF ONE-HALF TO ARTHUR B. FOSSEEN, OF SPOKANE, WASHINGTON

PIPE JOINTER

Application filed July 3, 1928. Serial No. 290,250.

My present invention relates to an improved pipe jointer or portable appliance which is adapted to form a mold between the bell and butt ends of a pipe into which mold plastic cement is poured to seal the joint between the ends of the pipe section.

In laying lines of sewer pipe, drains, irrigation pipe or the like, it is customary to use a plastic or semiplastic bituminous cement, as this type of cement allows for expansion and contraction due to changes in temperature, without causing a leak or break in the joint. The device of my invention is designed to be applied at the joint between two sections for the purpose of forming a dam or mold about the joint in order that the plastic cement may readily be poured into place.

The device or appliance is portable and may readily be assembled, locked in position for pouring, and after the cement has set the appliance may readily be removed and cleaned for use at the next joint.

The invention consists in certain novel combinations and arrangements of parts as will hereinafter be more fully set forth and claimed.

In the accompanying drawings, I have illustrated one complete example of the physical embodiment of my invention wherein the parts are combined and arranged according to the best mode I have so far devised for the practical application of the principles of my invention.

Figure 1 is a perspective view showing the device of my invention applied to the joint between two pipe sections and ready to receive the plastic cement;

Fig. 2 is a longitudinal detail sectional view through the pipe joint as at line 2—2 in Fig. 1;

Fig. 3 is an enlarged view showing the device ready for application to the pipe joint, with the funnel unrolled or unwrapped;

Fig. 4 is a view of the device as applied to the pipe joint but before being locked in position;

Fig. 5 is a view similar to Fig. 4 but showing the device in locked position; and Fig. 6 is an enlarged detail sectional view at line 6—6 of Fig. 3.

In carrying out my invention, I have shown a pipe section 1 having the bell end 2 and an adjoining section 3 with the usual butt end 4 which is inserted in customary manner within the bell end of the pipe section 1.

The appliance or pipe jointer of my invention includes a tube or casing 5 which is fashioned of flexible material such as cloth or rubber fabric and this tube is provided with a suitable filling 6 to give it strength and body and to permit the tube to be wrapped around the pipe section 3 and form a dam at the side of the opening of the bell end of the section 2. The tube or casing which forms the dam provides an annular space within the bell 2 into which the plastic cement is poured for the purpose of sealing the joint. The appliance is applied to the joint and after being properly positioned the cement is poured and the appliance remains at the joint until the cement has properly set, after which the appliance is removed.

The mold or dam which is formed by the filled tube 5 is provided with a side chain 7 which when the appliance is in position is located at the outside of the dam, and this chain is secured to the tube at the seam of the tube and the ends of the chain terminate at the ends of the tube.

One end of the chain is provided with a lever 8 which is secured as at 9 to one of the links of the chain and this lever has an angular arm 10 with an overhanging locking lug 11 thereon. At the other end of the lever 8 a spring 12 is anchored and at the free end of this spring a locking hook 13 is carried.

As seen in Figs. 4 and 5, the hook 13 is designed to engage a selected link on one end of the chain and then by swinging outwardly the free end of the lever 8 from position in Fig. 4 to position in Fig. 5, the ends of the tube or dam are drawn together as indicated in Fig. 5. In this position, the hook is slipped under the locking lug 11 and thus by the use of the lever, the spring, the hook and the lug, the two ends of the chain and dam are held in juxtaposition, but spaced slightly apart for the reception of the pouring funnel.

The pouring funnel is made up of a flexible wrapper or sheet 14 of fabric, rubber or other suitable material and this sheet which has binding strips 15 on its inclined edges is fashioned to form a truncated cone or funnel as indicated in Fig. 1. The pouring funnel is located at the top of the pipe joint between the spaced ends of the dam, and when the lever 8 is turned to locked position in Fig. 5, the two ends of the dam are brought against the opposite sides of the lower end of the pouring funnel in order that the dam and the pouring funnel may be held in rigid relation.

It will be apparent that the plastic cement is poured into the open large end of the funnel and from the funnel the plastic cement flows down both sides of the pipe joint within the bell 2 to form the proper seal or joint.

After the annular plastic seal of cement has properly set, the lever 8 is released from the lug 11 and the hook 13 is released from the chain 7 to permit removal of the dam, and the funnel is removed and upwrapped or unrolled to permit removal of any excess cement. After the parts have been separated and the dam and funnel scraped or cleaned of excess cement, the parts are ready to be applied at a succeeding joint in the pipe line for use as heretofore described.

Having thus fully described my invention, what I claim as new and desire to secure by Letters Patent is—

1. The combination with a flexible dam adapted to encircle a pipe joint and provided with a side chain, of a lever pivoted at one end of the chain and provided with an angular hook, a spring connected to the free end of the lever and a hook on said spring adapted to engage the other end of the chain, and a funnel adapted to be clamped between the free ends of the dam.

2. The combination with a funnel, of a flexible casing adapted to form an annular dam about a pipe joint and provided with a side chain, of a lever pivoted at one end of the chain and provided with an angular arm and an overhanging lug, a spring at the other end of the lever and a hook on said spring, whereby the hook may engage a link on the opposite end of the chain and be locked under said lug.

In testimony whereof I affix my signature.

ALBERT E. RASMUSSEN.